Patented Mar. 9, 1937

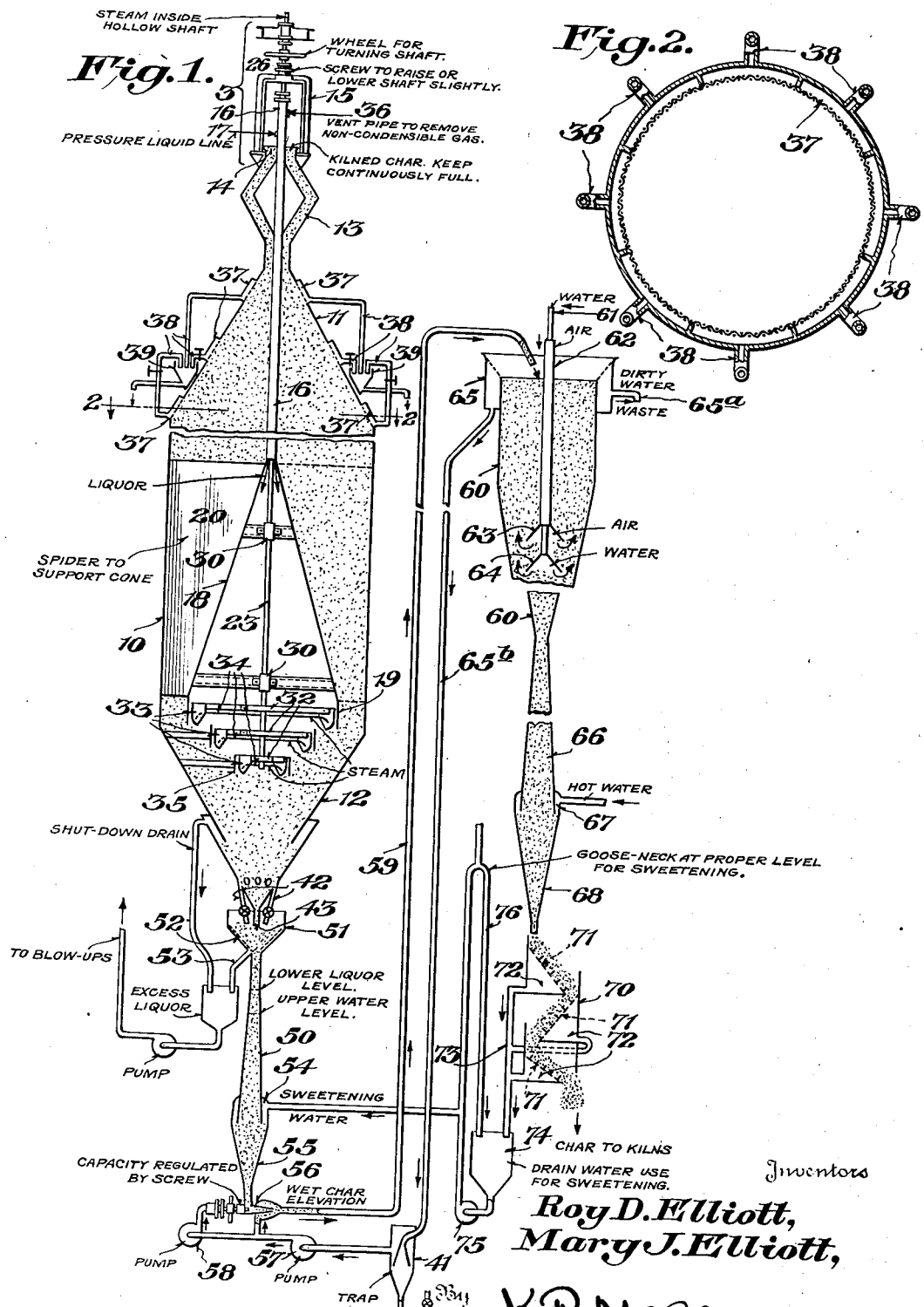

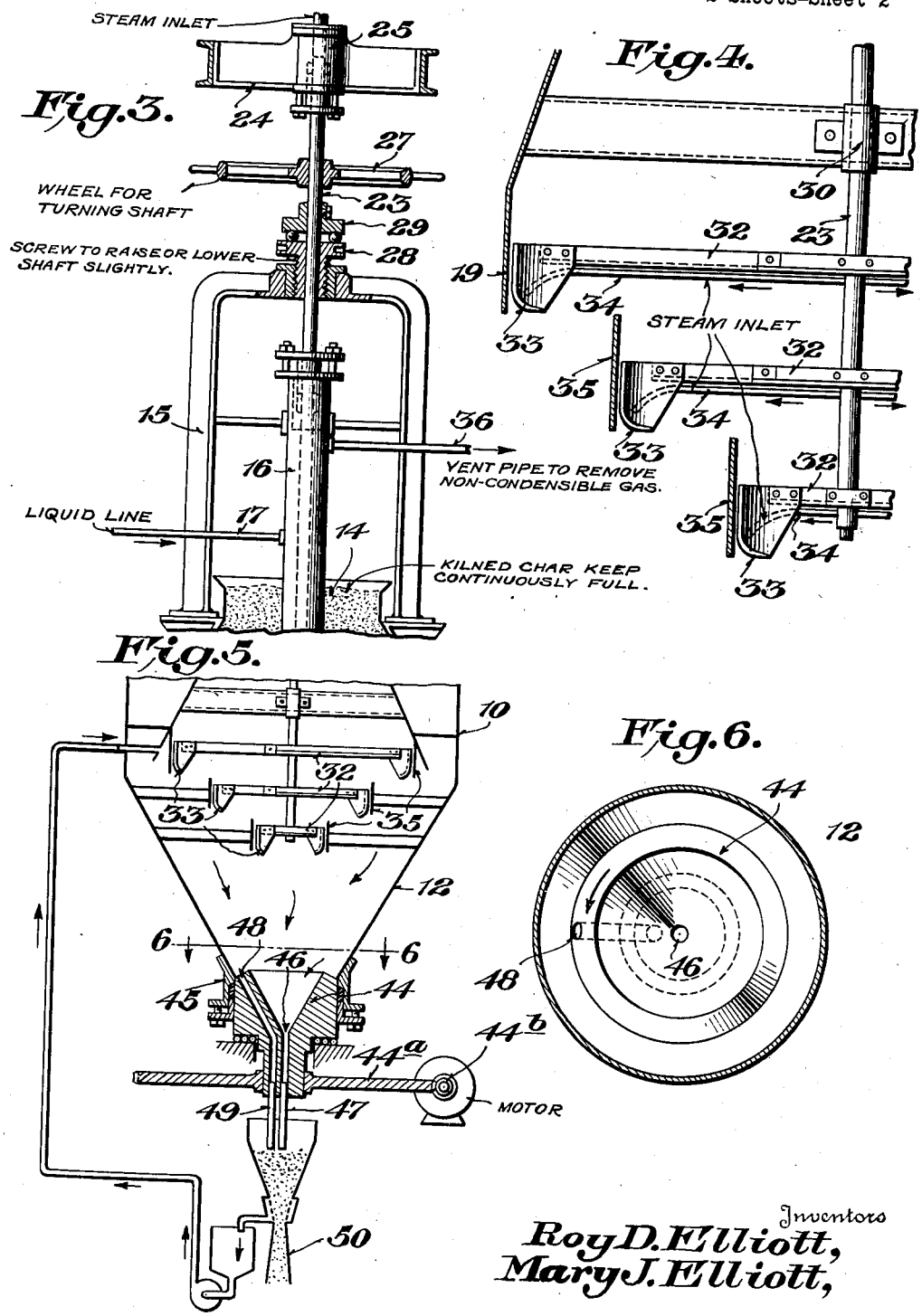

2,073,388

UNITED STATES PATENT OFFICE 2,073,388

MEANS FOR TREATING LIQUIDS

Roy D. Elliott and Mary J. Elliott, Crockett, Calif.

Application August 21, 1933, Serial No. 686,130

2 Claims. (Cl. 127—9)

This invention relates to improved methods and means for treating liquids; and it comprises a process of treating sugar solutions with boneblack in continuous and economical operation wherein the solution is passed in a continuous flow under suitable pressure first downward and then upward in reverse flow through a continuously and downwardly moving packed column of granular boneblack in which a constantly renewing filtering face is formed and presented to the downward flow of solution, the boneblack being continuously withdrawn from the bottom of the column, drained by displacement of the sugar solution with water and then washed, revivified and returned to the top; and it further comprises an organization of apparatus useful in the performance of said process wherein an open topped casing for the boneblack column is provided at or near the bottom with regulated means for discharging boneblack at spaced points, a liquid inlet pipe extends through the open top to a point somewhat above the bottom where it terminates in a coned distributor adapted to form a filtering face in the boneblack column, one or more scrapers adapted to level the filtering surface are operated by means of a hollow shaft extending through the inlet pipe and provided with means for introducing steam for maintaining the required temperature, a plurality of staggered outlets for the treated sugar solution are placed somewhat below the top of the casing, a "sweetening off" chamber for displacing with water the sugar solution from the discharged boneblack communicates with the discharge means with provision for regulating the discharge and washing means adapted to be operated in coordination with the sweetening off is provided; all as more fully hereinafter set forth and as claimed.

In another and copending application, Ser. No. 638,030, we have described and claimed a new way of clarifying liquids combining the advantages of downflow and upflow in continuous operation and we have also described and claimed a new type of continuous downflow and upflow filter generally useful in clarifying turbid liquids. The present invention is in some of its aspects an improvement on the invention of the prior application.

We shall here describe our invention more particularly as directed to a betterment of ways of using boneblack in sugar refineries.

In all large scale sugar refineries boneblack or bone char is used for effecting the final decolorization of the sirups. Its use is on the vast scale. In a large refinery there may be as many as 100 boneblack units, each an iron casing 6 to 10 feet in diameter and 20 to 30 feet tall, filled with boneblack. The interest on the amount of boneblack in stock in a refinery is a significant item in the cost of refining sugar. In each unit granular boneblack is placed in a vertical column through which strong sirups, usually of 60° to 68° Brix, are passed downward, the rate of flow being ordinarily 1000 to 3000 gallons per hour. The apparatus is kept hot, that is at a temperature usually about 80° C., to prevent souring and to reduce viscosity. After a time the decolorizing power of the column of boneblack becomes exhausted and the sirup contained is drained off, the boneblack being then "sweetened off" by down-flowing water. It is then revivified in kilns.

In prior processes the amount of boneblack in use is much above that theoretically necessary. The time during which it is actually working on liquors is usually about equal to the inactive time during which it is being "sweetened" washed, drained, emptied out of and filled into the decolorizing unit. Furthermore the zone of exhaustion of the boneblack gradually moves from top down but in prior practice it has been uneconomical to continue the operation until the bottom layers of boneblack are completely exhausted.

When the economical limit of exhaustion of the boneblack is reached a flow of "sweeting off" water is passed through the boneblack. At the outlet first appears a sirup of a density and purity approximating that of the liquor in process, the following effluent gradually becoming thinner. The "sweet-waters" are sent elsewhere for concentration and purification. They are commonly rather impure and require extensive purification. The water displacing the liquor in the char especially after the sweet water has reached the dilute stage dissolves more or less adsorbed matter. To some extent, colloidal suspensions are formed. Some of the colloidal matter remains with the char and some goes forward with the sweet-water. That remaining with the char and going through the revivification treatment is apt to impart a haze to the sugar solutions in subsequent use of the char, giving a dull appearance to the finished sugar. The amount of water used in sweetening off is rather large, and all this water must be re-evaporated subsequently to regain contained sugar, adding substantially to the expense of operation.

The principal duty of a sugar refinery is refining liquors and sirups made by dissolving, or "melting", raw sugar. But in addition to these sirups there are many other sirupy sugar solutions to be handled. All sirups sent to the boneblack are first filtered to free them of mechanical impurities. It is the practice of the refiner to use boneblack only for decolorizing and adsorption of soluble non-sugars.

The stationary boneblack column in prior practice is used for the decolorization of previously filtered liquors. If previously flocculated but unfiltered liquors were put on the boneblack the accumulated sediment would soon stop the flow. Further, the prior practice of washing the boneblack by downward flow of water does not remove sediment. This sediment would accompany the boneblack to the kilns and have a deleterious effect in its subsequent reuse.

Various attempts have been made to replace the described type of operation by continuously operating devices. But these have not proved efficient in practice because of non-recognition of the necessities of the operation.

In the present invention, time, labor and money are economized by employing a particular type of continuous operation; the boneblack and the sugar solution passing, so to speak, in an intimate countercurrent with continuous introduction and removal of boneblack from the system. A combined mechanical filtration and decolorizing treatment becomes possible, the removed boneblack being treated in detail to remove dirt; something not possible in using boneblack in a fixed mass. The flow of sugar solution through the system is uninterrupted and all sugar solution comes through uniformly decolorized. The boneblack is completely cleaned before revivification and reuse.

In the present invention a downwardly moving packed column of granular boneblack is established and maintained in a casing of suitably proportioned dimensions and sugar sirup is introduced at a point somewhat above the bottom of the column and is caused to pass under pressure first downwardly through an upwardly presented face of boneblack in a pocket formed in a coned distributor. The direction of flow is then reversed and the sirup passes upwardly in countercurrent flow through the tightly packed downwardly moving column of boneblack. The upwardly presented face of boneblack is constantly renewed in the downward movement of the boneblack column aided by the downward flow of solution against the face and the renewal of the face may be further aided by leveling with scrapers arranged to be operated by a shaft supported at the top of the casing and extending through the boneblack column and the coned distributor. Advantageously and conveniently the sirup is or may be passed to the coned distributor through a pipe running from the top of the casing through the boneblack column and a hollow shaft for operating the scrapers may be placed in this pipe, the hollow shaft being provided with outlet members adapted to introduce steam into the system below the coned distributor to aid in settling the boneblack compactly and to maintain a desired temperature in the system.

The sugar solution is withdrawn from the casing at points somewhat below the top through a system of staggered outlets maintaining a regularized flow distributed over the cross-sectional area of the boneblack column. The boneblack is discharged from the bottom of the casing by gravitational flow through a system of conduits so arranged about the bottom of the casing as to permit of a regularized distribution of the downward passage of boneblack through the casing. Advantageously a rotatable outlet is or may be fitted into the casing bottom and continuously rotated by a motor, the arrangement being such as to discharge the boneblack successively from points distributed around the bottom of the boneblack column.

The boneblack, with adhering liquors is discharged into a sweetening off chamber advantageously in direct communication with the column casing and enclosing a second column of boneblack. In this chamber the sugar sirup remaining with the discharged boneblack is displaced in the column by water and is drained off through a suitable outlet near the top of the chamber; the displacement being effected by maintaining in the chamber a body of water at a controlled level with a slight upward flow of sugar solution from the boneblack. From the bottom of the displacing chamber the boneblack with the displacing water is continuously ejected into the top of a washing column where sediment and residual impurities are washed from the boneblack. The boneblack is then drained of water and the drained water is advantageously used to displace the sugar solution from the boneblack in the sweetening off column as above described.

The boneblack drained of water and dried is then revivified by recharring and used over again. Fresh boneblack is continuously fed into the top of the column casing to replace the spent char discharged from the bottom and thus to maintain the height of the treating column.

By appropriate design of the height and cross-sectional area of the casing enclosing the treatment column and by coordination of the movement of the column with the flow of sugar solution through the column a high efficiency in the use of boneblack can be attained. The boneblack is in continuous action filtering and decolorizing sugar solution, except for the relatively short time required for sweetening off and revivification. There is substantially no inactive time. All the advantages of countercurrent action are obtained. A minimum quantity of boneblack is required in process. Tendencies to loss of sugar by inversion are counteracted. Preliminary separate mechanical filtration may be eliminated.

By sweetening off or displacement of the sirup from the bone char in a coordinated continuous operation interposed between the decolorizing treatment and the washing of the char, the quantity of sweet water and re-solution of adsorbed impurities are reduced to a minimum. Thin sweet-water is not produced.

In the accompanying drawings we have shown, more or less diagrammatically, organizations of apparatus elements within our invention and useful in operation of the described process. In this showing, Fig. 1 is a view in elevation with parts in section of an apparatus for continuous boneblack treatment of sugar solutions with continuous sweetening off of the boneblack and removal of impurities from the boneblack;

Fig. 2 is a plan view in detail of the means for withdrawing treated sugar solution from the treatment column, the view being on the line 2—2 of Fig. 1;

Fig. 3 is an enlarged sectional view of a portion of the apparatus indicated by the bracket 3 in Fig. 1;

Fig. 4 is a detail in section of the scrapers and steam introducing means of Fig. 1;

Fig. 5 is a sectional view of a modified portion of the apparatus of Fig. 1; and Fig. 6 is a horizontal section along the line 6—6 of Fig. 5.

Referring to the figures, a vertical casing 10 adapted to enclose a column of granular boneblack is formed with a conical top portion 11 and a conical bottom portion 12. Advantageously the top portion 11 is extended in an annular portion 13 shaped as two cones connected at a common base, the upper cone terminating in an open cylindrical portion 14 adapted to receive a feed of granular bone char. This top construction serves the purpose described in our copending application Serial No. 638,030. Above the casing is shown a spider 15 adapted to support a liquid inlet pipe 16 which runs through the top of the casing 10 and connects with a cone 18 with a cylindrical mouth 19, the cone being supported in the casing by a spider 20. Through the pipe 16 extends a hollow shaft 23 which is shown as held at the top end by a member 24 and provided with means for admitting steam into the hollow shaft shown at 25. Means for rotating the shaft may be provided in bar 26 or wheel 27. The position of the shaft may be adjusted by means of screw 28 and a collar 29 with an interposed ball bearing, screw 28 being, as shown, threaded into a stationary member supported by the spider 15. The shaft 23 is shown as provided with bearings 30 supported by cone 18. At the lower end of shaft 23 are attached cross arms 32 and plow-shaped scrapers 33, which are adapted upon rotation of the shaft to aid in maintaining a level face of boneblack near the mouth of cone 18. Cylinders 35 supported from the casing 10 are provided to aid in directing the axial movement of boneblack. Connected into shaft 23 are outlet members 34 for distributing steam introduced through the shaft. Liquid to be treated is delivered to pipe 16 by a line 17 connected to pipe 16 above the casing. A vent pipe 36 runs from pipe 16 and serves to remove gases which may be trapped in the pipe.

Liquid introduced into the casing through the cone 18 exits from the casing through liquid outlet means arranged in the top conical portion 11 of casing 10. As shown, a plurality of screened liquid outlets 37 are provided at each of three levels, the object being to bring about a uniform flow of liquid throughout the mass of granular liquid treating material. There may be, for example, eight separate outlets at the lowest of the three levels with six outlets at the middle level staggered in position above those on the lowest level and four staggered outlets at the topmost level. A pipe 38 runs from each outlet and these pipes all deliver into a common receiver 39 from which the treated liquid may be run for further disposal. The outlet pipes on the lowest and middle levels are best provided with valves in order that these outlets may be throttled sufficiently to cause a flow through the topmost outlets. The outlets are designed to remove from the casing all liquid entering so that the mass of boneblack above the outlets is substantially dry.

Valved discharge conduits 42 for withdrawing boneblack from the casing 10 are arranged about the end of the bottom conical portion 12 of the casing. These conduits are designed to be operated in succession so as to move the char uniformly through casing 10. A central or axial conduit 43 is usually provided in addition to a plurality of conduits distributed around the periphery. An alternative improved discharge mechanism for the boneblack is shown in Fig. 5. In this modified discharge a rotatable conical member 44 provided with suitable bearings is fitted to the bottom end of the casing with a stuffing gland 45. In the member 44 is axial passage 46 with a connected conduit 47 and, as shown, a single peripheral passage 48 with a connected conduit 49. A worm wheel 44a and a worm 44b with a motor are shown for rotating the member 44.

In operation of the process of treating sugar sirups with bone char, the casing 10 is kept filled to the top 14 with bone char, so as to form a continuous column of bone char. The sugar sirup is introduced under pressure through the pipe 16 and the cone 18. And the liquid overflows through the outlets 38 in the top conical portion 11 of the casing 10. The height and shape of the column of bone char serves to form a locked bed of tightly packed granules. A pocket in the bone char column is defined by the cone 18 and an upwardly presented filtering face of boneblack is formed at the mouth of the cone. The liquid pressure upon this pocketed face is sufficient to force the liquid to flow downward through the face and sediment carried by the liquid is filtered from the liquid and deposited upon the face. The layer of deposited sediment itself acts as a filter. As the bone char is withdrawn from the bottom of the column through conduits 42 and 43 or 47 and 49, as the case may be, the downward movement of the boneblack causes a removal of the sediment laden bone char from the pocketed face at the mouth of the cone 18 and renewal of the face with boneblack from above. The downward movement and renewal of the face is aided by the action of the scrapers 33, which are actuated by occasional rotation of the shaft 23. With proper coordination of the renewal of bone char from the bottom of the column with the pressure and rate of flow of the sugar sirup and the amount of colored matter required to be removed, the continuing result of the downward filtration of liquid through the pocketed face and the succeeding reversed flow upward in intimate countercurrent contact with the downwardly moving bone char is complete clarification of the sugar sirup and its complete decolorization.

The bone char removed from the bottom of casing 10 is or may be completely spent as far as its decolorizing power on sugar solutions is concerned and it is also contaminated with sediment and various impurities removed from the sugar sirup. To separate the sugar sirup from the char we establish a second column of char and displace the solution upward from the char by moving the char column downward through a body of water maintained at a level below the top of the column. This operation is conducted in a chamber 50 having a hopper top 51 provided with a screen 52 and a draw-off pipe 53 at the neck of the hopper. Below the hopper, chamber 50 has a conical or outwardly flaring shape, being smaller at the top and larger at the bottom. This shape causes a constant movement of the individual char granules relative to each other and prevents channeling. Water is introduced near the bottom of the conical chamber, advantageously through a trapped inlet 54, and is allowed to rise to a predetermined level in the column. A collecting hopper 55 forms the bottom of chamber 50 and the char and adhering water are removed through the neck of this hopper by positive means, such as the double ejector 56 shown, the double ejector being actuated by pressure flows of water supplied by pumps 57 and 58.

In the arrangement illustrated in Fig. 1, the withdrawal of bone char from casing 10 is actuated by the ejection of char from the bottom of chamber 50. The conduits 42 and 43 deliver char into the hopper 51 as long as the top level of the char in hopper 51 is below the conduit mouths. Piling up of the char to the level of the conduit mouths effectually stops the discharge of char from the casing 10.

In operation, the organization shown serves to "sweeten off" the bone char with only slight dilution with water of the sugar liquor displaced from the bone char. Proper determination of the water level in chamber 50 gives the small upward flow of water required to counteract downward diffusion of the sugar liquor. Above the level of sugar-free water there is a layer of dilute sugar solution upon which rests the dense solution displaced from the bone char. As we have found, the char can be substantially stripped of all adhering sugar solution, the char and water ejected from the bottom of hopper 55 being practically free of sugar, and little or none of the foreign matter extracted from the sugar solution in casing 10 is returned to the liquor draining off through outlet 53. In short, the operation effects substantially complete recovery of the sugar solution remaining with the char without substantial contamination of the recovered solution by the impurities in the char.

The recovered sugar solution may either be sent to the blow up tanks as indicated by the legend in Fig. 1 or it may be returned to the system in casing 10 as indicated in Fig. 5. In operating on sugar solutions in the usual production of cane sugar and beet sugar, the solution to be clarified and decolorized is first given a defecating treatment with flocculating agents such, for example, as a soluble phosphate and lime or carbon dioxide gas and lime.

The spent char sweetened off in chamber 50 together with the greater part of the water introduced into chamber 50 through inlet 54 are ejected through pipe 59 into a washing cone 60, where the char is agitated in a body of water introduced through the line 61 by air introduced through line 62. Advantageously, as shown, the air and water pipes are concentric and are arranged to deliver through distributors 63 and 64. The operation in washing cone 60 dislodges from the char the sediment removed from the sugar solution in casing 10. The water and dislodged sediment overflow the cone 60 into a collecting compartment 65 and may be run to waste through outlet pipe 65a. A pipe 65b running from compartment 65 may serve to supply the ejector pumps 57 and 58 with water. A sediment trap 41 may be placed in line 65b.

The bottom of cone 60 is shown in direct communication with a char washing device 66, which comprises a conical chamber similar to sweetening off chamber 50. Into this chamber hot water is admitted through a trapped inlet 67. The washing chamber has a hoppered bottom 68. In this chamber the soluble impurities carried by the char are washed out, the wash water joining the water in cone 60 to be run to waste.

From hopper 68 the char and clean adhering water runs to a draining device 70. This device comprises a series of ribbed perforated draining plates 71 in zigzig arrangement with a chamber 72 beneath each draining plate for collection of the drained water. From chambers 72 the pipes run to a manifold 73 which carries the drained water to a tank 74. The washed char drained of water in device 70 is taken to revivifying kilns from which it is conveyed to receiver 14 at the top of casing 10.

The clean water drained from the washed char and collected in tank 74 is conveniently used for sweetening off in chamber 50. Any other clean water may be used. For this a pump 75 takes the water from tank 74 and delivers it to the sweetening water inlet 54. Advantageously the desired level of water in chamber 50 is maintained by means of a vented gooseneck 76 interposed between the pump 75 and the inlet 54. The water level in chamber 50 and the quantity of sweetening water flowing into the sirup displaced from the bone char in chamber 50 are automatically predetermined by the height of gooseneck 76.

While we have more particularly described our apparatus in its use with boneblack for decolorizing sugar solutions, it may of course be used with boneblack for other liquids. Instead of boneblack, boneblack substitutes may be employed. Where the filtering function only of the apparatus described is desired, any other granular material, such as sand, comminuted minerals, etc. may be employed.

In purifying sugar liquors by the described process, other purifying methods may be employed before or after the treatment with bone char in the way described.

The described apparatus has a wide range of utility in raw sugar factories, both beet sugar and cane sugar. It is, for example, useful in the carbonatation process in beet factories. And it may be usefully employed in handling cane juices.

The herein described apparatus is useful in the performance of various leaching operations.

What we claim is:

1. Apparatus for continuous treatment of a sugar sirup or other liquid with boneblack or other granular material to filter and to purify the liquid, said apparatus comprising an elongated vertical casing having a top adapted to be continuously supplied with granular material during operation of the apparatus, means at the bottom of the casing for discharging granular material therefrom, liquid outlet means in the upper portion of the casing but below the top, an open bottomed chamber within the casing adjacent but above the bottom thereof, said chamber being adapted to form a pocketed upwardly presented filtering face in the body of granular material in the casing, a liquid inlet line running to said chamber, a rotatable vertical shaft running from above the casing through the chamber and means operable by the shaft for moving granular material from the pocketed face formed by the chamber.

2. In the apparatus of claim 1, a liquid inlet line running vertically through the casing to the pocket forming chamber with the vertical shaft running through said inlet line.

ROY D. ELLIOTT.
MARY J. ELLIOTT.